Sept. 8, 1931. R. PROELL 1,822,667
OIL PRESSURE REGULATING DEVICE FOR UPHOLDING
AN EVEN SPEED OF MACHINES
Filed Jan. 14, 1930 2 Sheets-Sheet 2

Inventor:-
Reinhold Proell
by attorneys

Patented Sept. 8, 1931

1,822,667

UNITED STATES PATENT OFFICE

REINHOLD PROELL, OF DRESDEN—A., GERMANY

OIL-PRESSURE REGULATING DEVICE FOR UPHOLDING AN EVEN SPEED OF MACHINES

Application filed January 14, 1930, Serial No. 420,746, and in Germany May 3, 1929.

The invention refers to an oil-pressure regulating device, in which an oil-pump driven by a machine to be regulated feeds a servomotor, the latter being geared by means dependent upon the speed or run of the machine. Such like devices are known; however formerly there were generally used for controlling the servomotor so-called speed-governors having an action based on the centrifugal force of revolving masses, whereas lately it was often proposed to let the oil-pressure produced by an oil-pump act onto a spring- or weight-loaded regulating piston, the oil-pump receiving its motion from the machine to be regulated.

Although these proposals offer a number of advantages over the constructions requiring a governor using centrifugal force, they still show a number of disadvantages, inasmuch as the movements of the regulating piston will under the action of the oil-pressure only take place slowly and draggingly, so that it became necessary for the purpose of avoiding non-sensitiveness to provide shaking or jolting means, which necessitate the arrangement of special auxiliary devices. Thus, as well as by having to use two oil-pumps the construction became difficult and expensive, facts which are entirely avoided by the regulating device according to the present invention.

The new result is seen in the fact that, with an oil-pressure regulating device for upholding an even speed of machines, the oil under pressure emanating from an oil-pump driven from the machine to be regulated, is conducted to a distributing valve either rotating or sliding back and forth, said valve feeding alternately a spring or weight loading regulating piston and a servomotor actuated by said piston, and thus at the same time acts like a shaking or jolting device overcoming or reducing the non-sensitiveness of regulation.

Furthermore according to the invention the distributing valve runs in an adjustable sleeve or casing, by which the relation between the time of work and the time of rest of the pressure-regulator may be altered and adapted to the working conditions.

Figure 1:
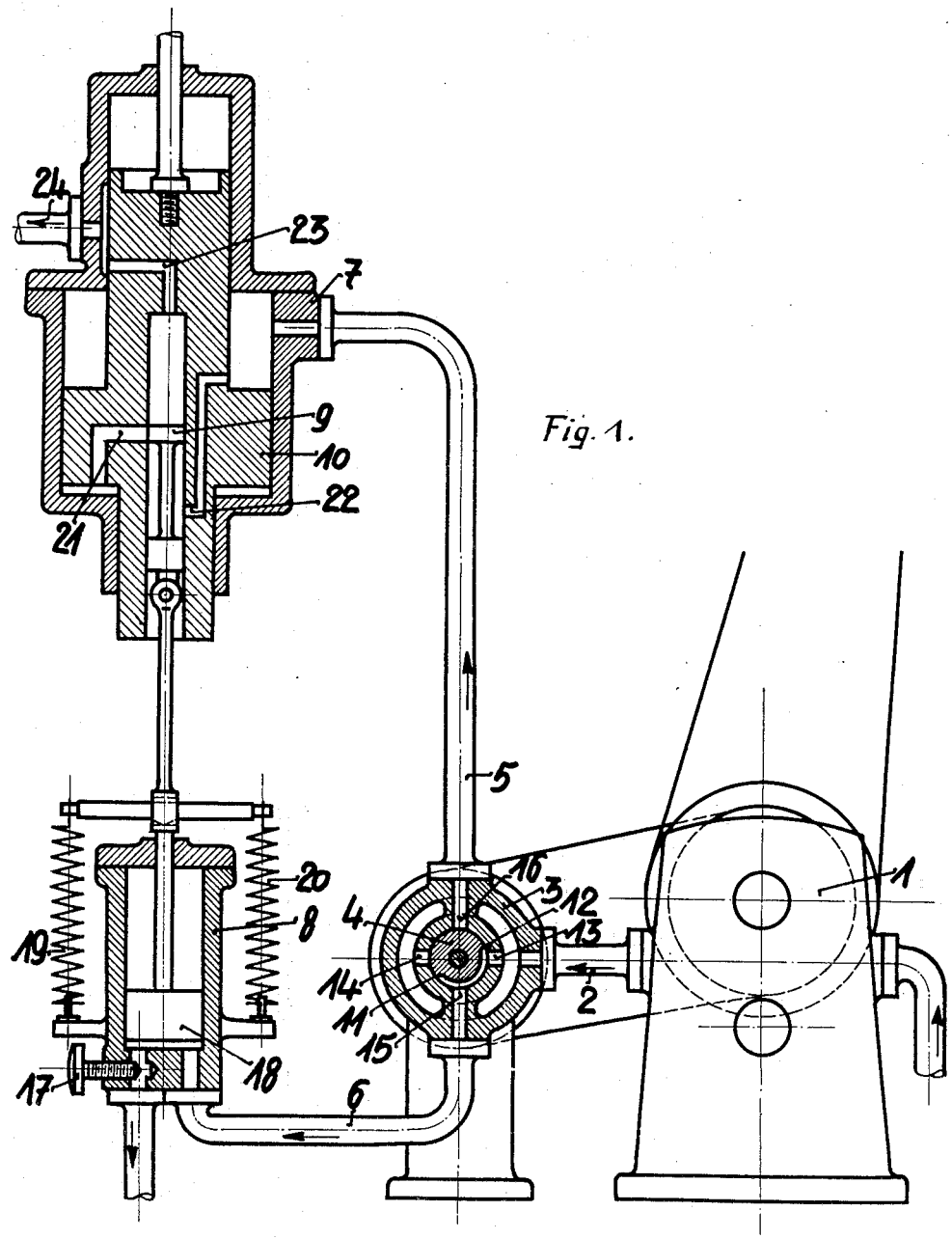
Figure 2:
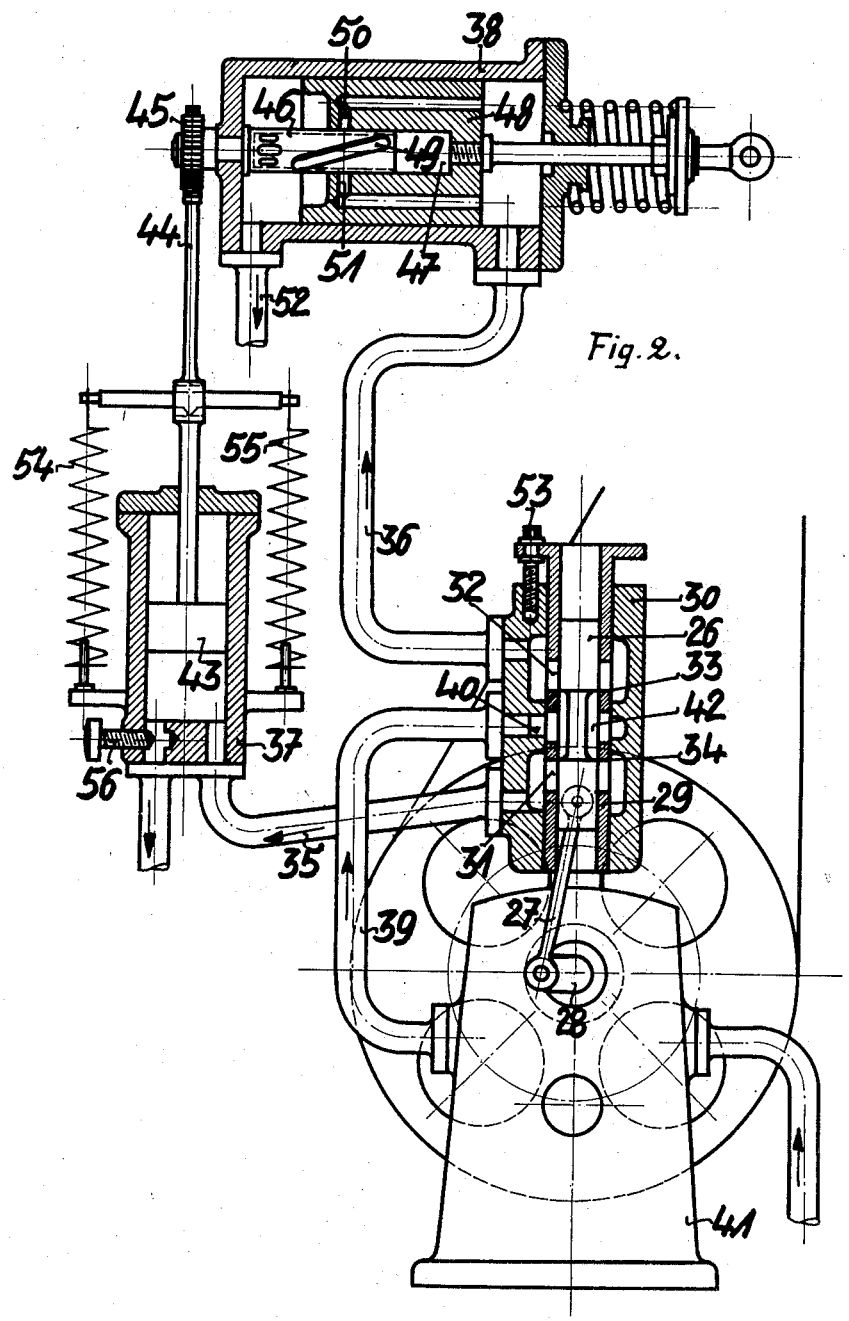

The arrangement according to the invention is shown by way of example on the annexed drawings on which Fig. 1 represents one mode of construction, whereas Fig. 2 is another mode of construction, both on a schematic scale.

In the first figure 1 is the oil-pump driven by the machine to be regulated, serving to press the oil through the pipe 2 into the valve-casing 3, in which there is arranged a revolving distributing valve 4. Off said casing 3 there are branching two conducting pipes 5 and 6, of which the first leads to the cylinder 7 of the servomotor whereas the second leads to the pressure-regulator 8, the latter controlling the movements of the piston 10 of the servomotor by means of either a turning slide, or a valve or pin 9.

The distributing valve 4 is provided with edges 11 and 12, which co-operate with the edges of the openings 13 and 14 through which the oil contained in the pump 1 is passed to the distributing valve, as well as with the edges of the openings 15 and 16, through which the oil passes to the pressure-regulator 8, or to the servomotor 7, in such a manner that the pressure-regulator and the servomotor consecutively and alternatively are fed by the oil-pump and thus will not disturb each other in their action. Through the opening and closing of the channels however permanent differences in pressure will be effected which act in the same manner as the known shaking or jolting devices to be abandoned and thus saved by the distributing valve according to the invention.

17 is an adjustable throttle-screw which makes it possible to regulate the speed of the machine at will in such a manner that on increasing the throttle opening by means of the screw 17 more oil will escape and consequently the machine will run faster, whereas on the other hand the machine can be made to run slower upon reducing the throttle opening.

The way in which the oil-pressure regulating device works is as follows:

When in consequence of a sudden reduction of work required of the machine (removal or decreasing of the load) the number of revolutions increases, the pump 1 will run faster and thus deliver more oil. As long as the connection between the conducting pipe 2 and the conducting pipe 6 is upheld by means of the distributing valve 4, more oil will flow into the space below the piston 18 of the pressure-regulator 8 than would be able to flow off through the exit-section adjusted by the throttle-screw 17, and the piston 18 will be lifted against the downward acting power of the tension-springs 19, 20; thus also the valve or pin 9 will be raised, the edges of which co-act with the edges of the channel 21, which leads to the space below the piston 10 of the servomotor. By means of the channel 22 the pressure-oil coming from the conducting pipe 5 will now be conducted to the channel 21 and through the latter to the lower large ring-surface of the servomotor-piston 10, whereby an overpressure will be obtained which pushes the piston 10 upwards until the edges of the valve or pin 9 will again coincide with the edges of the channel 21. The servomotor-piston thus makes an upward movement which is used for decreasing the power-supply and will again produce a new balance of power or equilibrium.

In case instead of a reduction of the work or load, an increase therein takes place, the pump 1 will run slower and thus deliver less oil, so that the springs 19 and 20 will pull the piston of the pressure-regulator downwards whereby the channel 21 will get connection with the channel 23 having connection with the delivery-pipe 24. In this case the large surface below the piston 10 will become pressureless, and the piston will move downwards under the action of the pressure-oil conducted through the pipe 5 and acting onto the top smaller ring-surface until the edges of the channel 21 and the valve or pin 9 will again coincide and the balance of power again be achieved. The small up- and down-movements of the pin 9 effected by the piston 18 of the pressure-regulator will thus not only prevent any non-sensitiveness of the gearing pin 9, but also any undesirable pressure-raise within the conducting pipe 5 as well as within the cylinder 7 of the servomotor by means of a regularly repeated connection of the channel 21 with the channel 22, resp. the feed-pipe 5, as well as with the channel 23, resp. the discharge-pipe 24.

Further advantages may be obtained if the distributing valve is not made to form a revolving turntable slide but a piston-slide moving back and forth, which is driven by a crank or an eccentric or an excentrically arranged pin and runs within an adjustable sleeve or casing.

Such arrangement is shown in Fig. 2, in which the distributing slide 26 formed as a circular slide is moved by means of the connecting rod 27 of the rotating crank 28, which may receive its motion from the machine to be regulated or from any other source. The distributing slide 26 slides within the sleeve 29, which is fitted into the casing 30 and possesses openings 31 and 32 having edges which as in the arrangement shown in Fig. 1, coact with the edges 33 and 34 of the distributing slide 26. Through the openings 31 and 32 the oil will reach the conducting pipes 35 and 36, of which 35 leads to the pressure-regulator 37, whereas 36 leads to the servomotor cylinder 38. The supply of oil herewith is effected from the pump 41 by means of the conducting pipe 39 through the openings 40, through which the oil passes into the shell-like groove 42 of the distributing slide 26, the edges 33 and 34 of which will in the middle position shown just close for a moment the openings 31 and 32. The piston 43 of the pressure-regulator transmits by means of a toothed rod or rack 44 and a tooth-wheel or pinion 45 its movements onto the turnable slide 46, being fitted into the cylindrical opening 47 of the servomotor-piston 48 and possessing in a known manner helical grooves 49 which co-act with bore-holes 50, 51 in the piston 48 of the servomotor. The pressure-oil supplied through the conducting-pipe 36 will just drive the piston 48 so far until the bore-holes 50, 51 come in contact with the helical grooves 49 of the turnable slide 46, whereupon a discharge of the pressure-oil to the discharge-pipe 52 begins and the piston will come to rest.

Also with this arrangement care is taken that disadvantageous reactions of the servomotor on the pressure-regulator are excluded, inasmuch as both of them will never simultaneously but only always consecutively receive pressure-oil. As it is desirable when using the oil-pressure regulating device to be able to regulate the time during which oil is supplied to the pressure-regulator there is provided an adjusting screw 53, by means of which the sleeve 29 may be displaced axially. In case the position of the slide shown in Fig. 2 just corresponds to the middle of the slide-stroke the pressure-regulator will during the time of half a revolution of the crank 28 be connected with the conducting pipe 39 and will be closed during this same period. For the purpose of achieving a medium state of balance of power it will be necessary that the piston of the pressure-regulator is lifted during the time of supplying oil just as much as it will fall within the consecutive closing period by means of the action of the springs 54 and 55. Now, on an unchanged adjustment of the throttle-screw 56 the lifting of the pressure-regulator will generally take place in a shorter time than its return through the power of the springs 54 and 55. If, however, the sleeve 29 is displaced downwards by means of the adjusting screw 53, the space of covering the opening 31 by means of the slide will be increased and the time of supplying oil to the pressure-regulator will be shortened. Like this also the distance to which the pressure-regulator rises during the time of supplying oil is also reduced, whereas on the other hand the springs 54 and 55 during the prolonged closing-period will now have more time to press the pressure-regulator down again, so that it will be easy on turning the adjusting screw 53 whilst the device works to soon find the condition under which the pressure-regulator will always again return to its original position and only perform equal oscillations around its state of equilibrium.

What I claim is:

1. In an oil pressure regulating device for upholding an even speed of machines, the combination with an oil pump driven by the machine to be regulated, of a pressure responsive device, a servomotor actuated by said pressure responsive device, said device being provided with an oil regulating screw, a rod forming an operative connection between said device and the servomotor, and distributing means for receiving the oil from the oil pump and feeding it alternately to the servomotor and to the pressure responsive device.

2. In an oil pressure regulating device for upholding an even speed of machines, the combination with an oil pump driven by the machine to be regulated, of a pressure responsive device, a servomotor actuated by said pressure responsive device, said device being provided with an oil regulating screw, a rod forming an operative connection between said device and the servomotor, a rotatable distributing valve adapted to receive the oil from the oil pump and to feed the oil alternately to the servomotor and to the pressure responsive device, and a piston in the servomotor provided with regulating channels.

In testimony, that I claim the foregoing as my invention, I have signed my name this 30th day of December, 1929.

REINHOLD PROELL.